United States Patent
Wang

(10) Patent No.: US 10,755,048 B2
(45) Date of Patent: Aug. 25, 2020

(54) ARTIFICIAL INTELLIGENCE BASED METHOD AND APPARATUS FOR SEGMENTING SENTENCE

(71) Applicant: BEIJING BAIDU NETCOM SCIENCE AND TECHNOLOGY CO., LTD., Beijing (CN)

(72) Inventor: Yiming Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/937,593

(22) Filed: Mar. 27, 2018

(65) Prior Publication Data
US 2018/0365209 A1    Dec. 20, 2018

(30) Foreign Application Priority Data
Jun. 19, 2017   (CN) .......................... 2017 1 0464446

(51) Int. Cl.
*G06F 40/284*   (2020.01)
*G06N 3/02*   (2006.01)
(Continued)

(52) U.S. Cl.
CPC .......... *G06F 40/284* (2020.01); *G06F 16/951* (2019.01); *G06F 40/242* (2020.01);
(Continued)

(58) Field of Classification Search
CPC ............... G06F 17/2735; G06F 17/277; G06F 17/2775; G06F 17/2785; G06F 17/271; G06F 17/2705
See application file for complete search history.

(56) References Cited

U.S. PATENT DOCUMENTS 6,721,697 B1 *   4/2004   Duan ................... G06F 17/277
                                                              704/2
2001/0009009 A1   7/2001   Iizuka
(Continued)

FOREIGN PATENT DOCUMENTS

CN     101261623 A     9/2008
CN     101458694 A     6/2009
(Continued)

OTHER PUBLICATIONS

Miikkulainen, "Subsymbolic Case-Role Analysis of Sentences with Embedded Clauses," *Cognitive Science* 20:47-73, 1996, 27 pages.
(Continued)

*Primary Examiner* — Thomas H Maung
(74) *Attorney, Agent, or Firm* — Seed IP Law Group LLP

(57) ABSTRACT

The present disclosure discloses an artificial intelligence based method and apparatus for segmenting a sentence. A specific embodiment of the method includes: lexing a to-be-segmented original sentence to obtain a set of words in the original sentence; performing sentence segmentation steps on a to-be-segmented sentence having an initial value being the original sentence; using the sub-sentence fragment not belonging to the set of words as the to-be-segmented sentence and continuing to perform the sentence segmentation steps, if the sub-sentence fragment not belonging to the set of words exists; and storing the original sentence in association with the plurality of sub-sentence fragments each time obtained by performing the sentence segmentation steps. The embodiment generates a segmentation result obtained by performing a multi-layered segmentation to the original sentence.

11 Claims, 5 Drawing Sheets

(51) Int. Cl.
    *G06F 16/951* (2019.01)
    *G06N 3/04* (2006.01)
    *G06N 3/08* (2006.01)
    *G06F 40/242* (2020.01)
    *G06N 5/02* (2006.01)

(52) U.S. Cl.
    CPC ............ *G06N 3/02* (2013.01); *G06N 3/0445* (2013.01); *G06N 3/08* (2013.01); *G06N 5/02* (2013.01)

(56) References Cited

U.S. PATENT DOCUMENTS

| | | | |
|---|---|---|---|
| 2013/0060560 A1 | 3/2013 | Mahkovec et al. | |
| 2017/0286403 A1* | 10/2017 | Popescu | G06F 17/271 |
| 2018/0060305 A1* | 3/2018 | Deleris | G06F 17/2785 |
| 2018/0173696 A1* | 6/2018 | Hosabettu | G06F 17/2735 |

FOREIGN PATENT DOCUMENTS

| | | |
|---|---|---|
| CN | 101887443 A | 11/2010 |
| CN | 102419778 A | 4/2012 |
| CN | 104077275 A | 10/2014 |
| CN | 104462051 A | 3/2015 |
| CN | 104657439 A | 5/2015 |
| CN | 105243055 A | 1/2016 |
| CN | 105893354 A | 8/2016 |
| CN | 105975454 A | 9/2016 |
| CN | 106570148 A | 4/2017 |

OTHER PUBLICATIONS

"Study The Application and Research of Hidden Markov Model in Chinese Geo-Entity," 2012, 75 pages.

* cited by examiner

| I | want to | take a taxi | to | Heilongjiang | Hailar |
|---|---|---|---|---|---|
| | 21.6 | 15.35 | 16.89 | 11.02 | 13.5 |
| 6.42 | 0.0 | 0.0 | 0.0 | 0.0 | 0.0 |
| 0.0 | 5.09 | 0.0 | 0.0 | 0.0 | 0.0 |
| 6.36 | 6.36 | 0.0 | 0.0 | 0.0 | 0.0 |
| 0.0 | 0.0 | 5.31 | 0.0 | 0.0 | 0.0 |
| 5.39 | 0.0 | 5.39 | 0.0 | 0.0 | 0.0 |
| 4.65 | 4.65 | 4.65 | 0.0 | 0.0 | 0.0 |
| 0.0 | 0.0 | 0.0 | 3.02 | 0.0 | 0.0 |
| 6.36 | 0.0 | 0.0 | 6.36 | 0.0 | 0.0 |
| 0.0 | 1.88 | 0.0 | 1.88 | 0.0 | 0.0 |
| 3.51 | 3.51 | 0.0 | 3.51 | 0.0 | 0.0 |
| 0.0 | 0.0 | 0.0 | 0.0 | 7.69 | 0.0 |
| 0.0 | 0.0 | 0.0 | 0.0 | 0.0 | 8.06 |
| 0.0 | 0.0 | 0.0 | 2.11 | 0.0 | 2.11 |
| 0.0 | 0.0 | 0.0 | 0.0 | 3.33 | 3.33 |

# ARTIFICIAL INTELLIGENCE BASED METHOD AND APPARATUS FOR SEGMENTING SENTENCE

CROSS-REFERENCE TO RELATED APPLICATIONS

This application is related to and claims priority from Chinese patent application no. 201710464446.3, filed with the state intellectual property office (SIPO) of the People's Republic of China on Jun. 19, 2017, the entire disclosure of the Chinese patent application is hereby incorporated by reference.

TECHNICAL FIELD

The present disclosure relates to the field of computer technology, specifically to the field of natural language processing technology, and more specifically to an artificial intelligence based method and apparatus for segmenting a sentence.

BACKGROUND

Artificial Intelligence, abbreviated as AI, is a new technological science, which researches on and develops theories, methods, techniques and application systems for simulating, extending and expanding human intelligence. As a branch of the computer science, artificial intelligence attempts to learn the principle of intelligence and produce a novel intelligent machine capable of making response in away similar to human intelligence. Researches in this field include robot, language recognition, image recognition, natural language processing and expert systems, etc.

In the process of processing the Chinese language, text demarcation using the sentence segmentation technology is an important technology. The traditional demarcation solution includes mainly the basic lex and the phrase lex. When performing classifying, a commonly used solution is the Named Entity Recognition (NER), which may be used to identify entities with specific meanings in the text, including mostly names, place names, organization names, proper nouns, etc.

However, these existing lex solutions can only provide a single lex result, which cannot meet the different requirements of different applications for the fragment demarcation. NER and other traditional classification information solutions can only identify the proper noun fragments, are not capable of providing the classification information for the descriptive fragments, but to excavate information through the vocabulary and other artificial means. Therefore, there is a need to improve the existing sentence segmentation solutions.

SUMMARY

The objective of the present disclosure is to provide an improved artificial intelligence based method and apparatus for segmenting a sentence, in order to solve the technical problem mentioned in the foregoing Background section.

In a first aspect, embodiments of the present disclosure provide an artificial intelligence based method for segmenting a sentence, including: lexing a to-be-segmented original sentence to obtain a set of words in the original sentence; performing sentence segmentation steps on a to-be-segmented sentence having an initial value being the original sentence, the sentence segmentation steps including: segmenting the to-be-segmented sentence into a plurality of sub-sentence fragments according to a record of being searched in a search engine for a word combination composed of a single word or different words in the to-be-segmented sentence, each sub-sentence fragment being a single word or a word combination; and ascertaining whether a sub-sentence fragment not belonging to the set of words exists in the segmented plurality of sub-sentence fragments; using the sub-sentence fragment not belonging to the set of words as the to-be-segmented sentence and continuing to perform the sentence segmentation steps, if the sub-sentence fragment not belonging to the set of words exists; and storing the original sentence in association with the plurality of sub-sentence fragments each time obtained by performing the sentence segmentation steps.

In some embodiments, at least one feature vector is extracted based on words in the to-be-segmented sentence, including: extracting a word vector of each word in the to-be-segmented sentence as a feature vector; extracting a feature vector based on an occurrence of the words in the to-be-segmented sentence in a search sentence dictionary, wherein the search sentence dictionary is generated according to statistics on search sentences used by a user when performing a search; or extracting a feature vector based on a context sentence of the to-be-segmented sentence in the original sentence.

In some embodiments, the segmenting the to-be-segmented sentence into a plurality of sub-sentence fragments according to a record of being searched in a search engine for a word combination composed of a single word or different words in the to-be-segmented sentence includes: extracting at least one type of feature vector according to the record of being searched in the search engine for the word combination composed of the single word or the different words in the to-be-segmented sentence; inputting the at least one type of feature vector into a recurrent neural network model to determine a segmentation point for segmenting the to-be-segmented sentence based on a sequence output by the recurrent neural network model, wherein the recurrent neural network model is used to characterize a correspondence between the at least one type of feature vector extracted according to the record of being searched in the search engine for the word combination composed of the single word or the different words in the to-be-segmented sentence and a description for whether words in the to-be-segmented sentence are in a sequence at the segmenting; and segmenting the to-be-segmented sentence into the plurality of sub-sentence fragments according to the determined segmentation point.

In some embodiments, the extracting at least one type of feature vector according to the record of being searched in the search engine for the word combination composed of the single word or the different words in the to-be-segmented sentence includes at least one of: extracting a feature vector based on whether the word combination composed of the different words in the to-be-segmented sentence has a matching search sentence in a search sentence dictionary and/or a score of the search sentence matching the search sentence dictionary; and extracting a feature vector corresponding to a word based on a number or a sum of scores of search sentences beginning, intermediating or ending with each word in the to-be-segmented sentence in the search sentence dictionary; wherein the search sentence dictionary records search sentences searched using the search engine, the score of each search sentence is generated based on a search frequency of the search sentence and/or use feedback information of a user conducting a search.

In some embodiments, the extracting at least one type of feature vector according to the record of being searched in the search engine for the word combination composed of the single word or the different words in the to-be-segmented sentence further includes at least one of: extracting a word vector of each word in the to-be-segmented sentence; and extracting a context feature vector of a context sentence of the to-be-segmented sentence in the original sentence.

In some embodiments, the method further includes constructing the search sentence dictionary, including: acquiring a set of search sentences input by the user when using the search engine; filtering the set of search sentences according to the search frequency of the search sentences; generating the score of the each search sentence in the search sentences according to the search frequency of the search sentences and the use feedback information of the user conducting the search using the search sentences; and storing the search sentences in association with corresponding scores to construct the search sentence dictionary.

In some embodiments, the method further includes training a model, including: acquiring a segmentation result generated by iteratively segmenting in advance a sample sentence according to a least segmentation algorithm; generating a training sample based on the segmentation result of each segmentation, and training the recurrent neural network model using the generated training sample; wherein an input vector in the training sample is at least one type of feature vector extracted according to the record of being searched in the search engine for the word combination composed of the single word or the different words in the segmented sentence of each segmentation, and the input vector in the training sample is a sequence used to describe whether the words in the segmented sentence of each segmentation are segmentation points.

In some embodiments, the storing the original sentence in association with the plurality of sub-sentence fragments each time obtained by performing the sentence segmentation steps includes: determining the original sentence as a root node, and determining successively the to-be-segmented sentence with the sentence segmentation steps performed each time and the plurality of sub-sentence fragments obtained by segmenting as a parent node and a plurality of corresponding child nodes, and constructing a tree hierarchy with nodes being sentence fragments.

In a second aspect, embodiments of the present disclosure provide an artificial intelligence based apparatus for segmenting a sentence, including: a lexer unit, configured for lexing a to-be-segmented original sentence to obtain a set of words in the original sentence; a segmentation unit, configured for driving the following subunits to perform sentence segmentation steps on a to-be-segmented sentence having an initial value being the original sentence: a segmentation subunit, configured for segmenting the to-be-segmented sentence into a plurality of sub-sentence fragments according to a record of being searched in a search engine for a word combination composed of a single word or different words in the to-be-segmented sentence, each sub-sentence fragment being a single word or a word combination; and an ascertainment subunit, configured for ascertaining whether a sub-sentence fragment not belonging to the set of words exists in the segmented plurality of sub-sentence fragments; an execution unit, configured for feeding back the sub-sentence fragment not belonging to the set of words as the to-be-segmented sentence to the segmentation unit, if the sub-sentence fragment not belonging to the set of words exists; and a storage unit, configured for storing the original sentence in association with the plurality of sub-sentence fragments each time obtained by performing the sentence segmentation steps.

In some embodiments, the segmentation subunit includes: an extraction module, configured for extracting at least one type of feature vector according to the record of being searched in the search engine for the word combination composed of the single word or the different words in the to-be-segmented sentence; a determination unit, configured for inputting the at least one type of feature vector into a recurrent neural network model to determine a segmentation point for segmenting the to-be-segmented sentence based on a sequence output by the recurrent neural network model, wherein the recurrent neural network model is used to characterize a correspondence between the at least one type of feature vector extracted according to the record of being searched in the search engine for the word combination composed of the single word or the different words in the to-be-segmented sentence and a description for whether words in the to-be-segmented sentence are in a sequence at the segmenting; and a segmentation module, configured for segmenting the to-be-segmented sentence into the plurality of sub-sentence fragments according to the determined segmentation point.

In some embodiments, the extraction module is configured for performing at least one of: extracting a feature vector based on whether the word combination composed of the different words in the to-be-segmented sentence has a matching search sentence in a search sentence dictionary and/or a score of the search sentence matching the search sentence dictionary; and extracting a feature vector corresponding to a word based on a number or a sum of scores of search sentences beginning, intermediating or ending with each word in the to-be-segmented sentence in the search sentence dictionary; wherein the search sentence dictionary records search sentences searched using the search engine, the score of each search sentence is generated based on a search frequency of the search sentence and/or use feedback information of a user conducting a search.

In some embodiments, the extraction module is further configured for performing at least one of: extracting a word vector of each word in the to-be-segmented sentence; and extracting a context feature vector of a context sentence of the to-be-segmented sentence in the original sentence.

In some embodiments, the apparatus further includes a search sentence dictionary construction unit, configured for: acquiring a set of search sentences input by the user when using the search engine; filtering the set of search sentences according to the search frequency of the search sentences; generating the score of the each search sentence in the search sentences according to the search frequency of the search sentences and the use feedback information of the user conducting the search using the search sentences; and storing the search sentences in association with corresponding scores to construct the search sentence dictionary.

In some embodiments, the apparatus further includes a model training unit, and the model training unit is configured for: acquiring a segmentation result generated by iteratively segmenting in advance a sample sentence according to a least segmentation algorithm; generating a training sample based on the segmentation result of each segmentation, and training the recurrent neural network model using the generated training sample; wherein an input vector in the training sample is at least one type of feature vector extracted according to the record of being searched in the search engine for the word combination composed of the single word or the different words in the segmented sentence of each segmentation, and the input vector in the training sample is a sequence used to describe whether the words in the segmented sentence of each segmentation are segmentation points.

In some embodiments, the storage unit is further configured for: determining the original sentence as a root node, and determining successively the to-be-segmented sentence with the sentence segmentation steps performed each time and the plurality of sub-sentence fragments obtained by segmenting as a parent node and a plurality of corresponding child nodes, and constructing a tree hierarchy with nodes being sentence fragments.

In a third aspect, embodiments of the present disclosure provide a device for segmenting a sentence, including: one or more processors; a storage apparatus, to store one or more programs; and when the one or more programs being executed by the one or more processors, cause the one or more processors to implement the method as described in any one of the first aspect.

In a third aspect, embodiments of the present disclosure provide a computer readable storage medium, storing a computer program thereon, the computer program, when executed by a processor, implements a method described by any embodiment in the first aspect.

The artificial intelligence based method and apparatus for segmenting a sentence provided by the present disclosure may perform multi-level and multi-granularity segmenting to the original sentence using the search history of the search engine, such that the result of the segmentation may be more widely applied.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
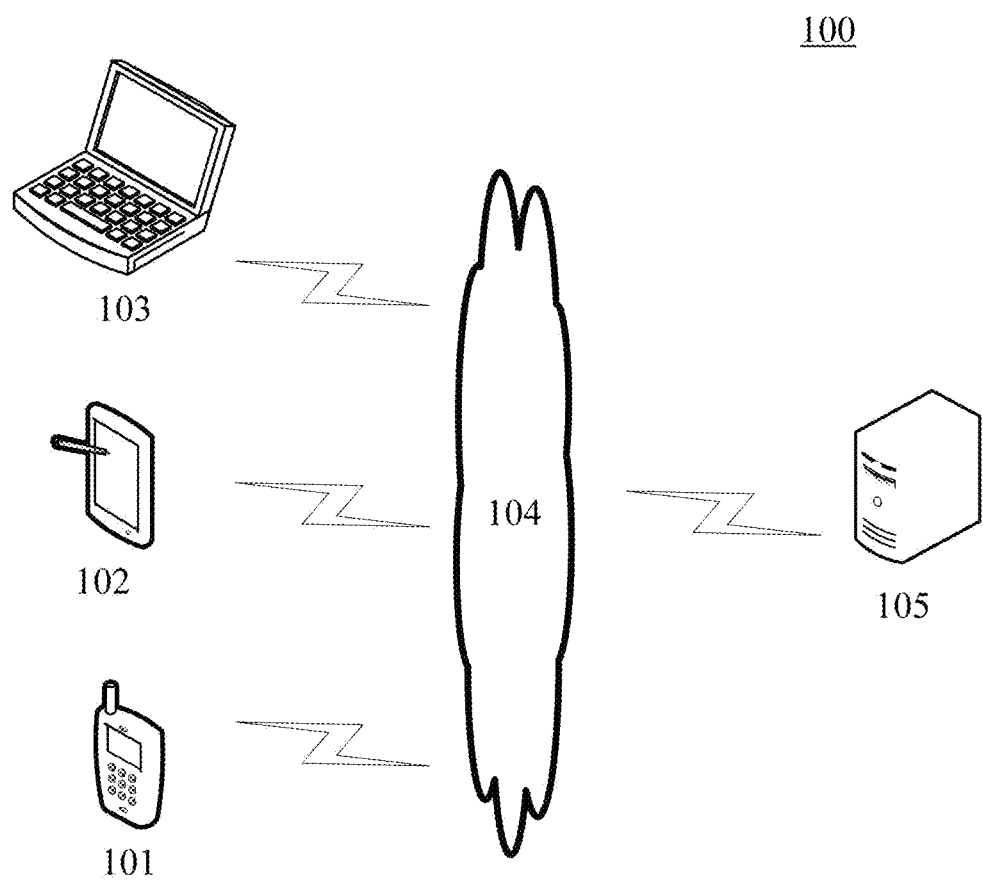
FIG. 1 is an exemplary system architecture diagram in which the present disclosure may be applied.

FIG. 1 shows an illustrative architecture of a system 100, which may be used by an artificial intelligence, based method for segmenting a sentence or an artificial intelligence based apparatus for segmenting a sentence according to the embodiments of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various communication client applications, such as web browser applications, search applications, and instant messaging tools may be installed on the terminal devices 101, 102 and 103.

The terminal devices 101, 102 and 103 may be various electronic devices having a display and capable of browsing a webpage, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server that provides various services, for example, a backend server that provides follow-up processing to the original sentences sent on the terminal devices 101, 102 and 103. The backend server may perform a sentence segmentation process on the received data such as the original sentences and feed back a result of the processing (for example, a result of the segmentation) to the terminal devices.

It needs to be noted that the artificial intelligence based method for segmenting a sentence provided by the embodiments of the present disclosure is generally executed by the server 105, or may be executed by the terminal devices 101, 102 and 103; accordingly, the artificial intelligence based apparatus for segmenting a sentence is generally provided in the server 105, or may be provided in the terminal devices 101, 102 and 103.

It should be appreciated that the numbers of the terminal devices, the networks and the servers in FIG. 1 are merely illustrative. Any number of terminal devices, networks and servers may be provided based on the implementation requirements.

Figure 2:
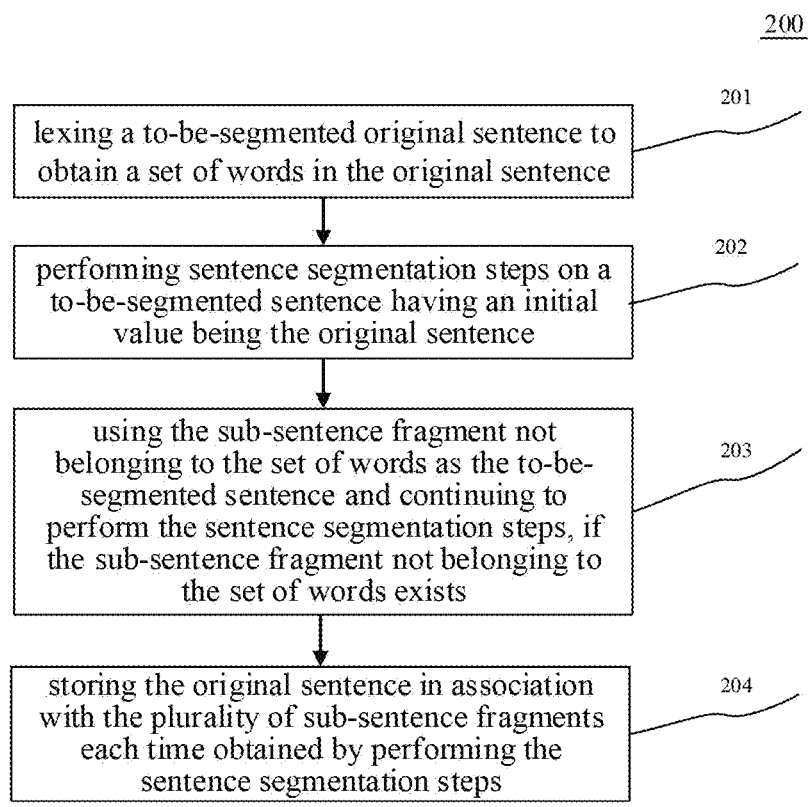
FIG. 2 is a flowchart of an embodiment of an artificial intelligence based method for segmenting a sentence according to the present disclosure.

With further reference to FIG. 2, a flow 200 of an embodiment of an artificial intelligence based method for segmenting a sentence according to the present disclosure is illustrated. The artificial intelligence based method for segmenting a sentence includes the following steps:

Step 201, lexing a to-be-segmented original sentence to obtain a set of words in the original sentence.

In the present embodiment, the electronic device (e.g., the server or terminal device as shown in FIG. 1) on which the artificial intelligence based method for segmenting a sentence operate may use various lex algorithms to perform lexing to the to-be-segmented original sentence, so as to obtain a set of words contained in the original sentence. The original sentence may be pre-stored locally or may be received from a user-operated terminal through a wired connection or a wireless connection.

Step 202, performing sentence segmentation steps on a to-be-segmented sentence having an initial value being the original sentence.

In the present embodiment, based on the set of words obtained in step 201, the electronic device may perform sentence segmentation steps on a to-be-segmented sentence. The sentence segmentation steps are used to segment the to-be-segmented sentence into a plurality of sub-sentence fragments with a finer granularity. For a specific execution flow of the sentence segmentation steps, reference may be made to FIG. 3.

Figure 3:
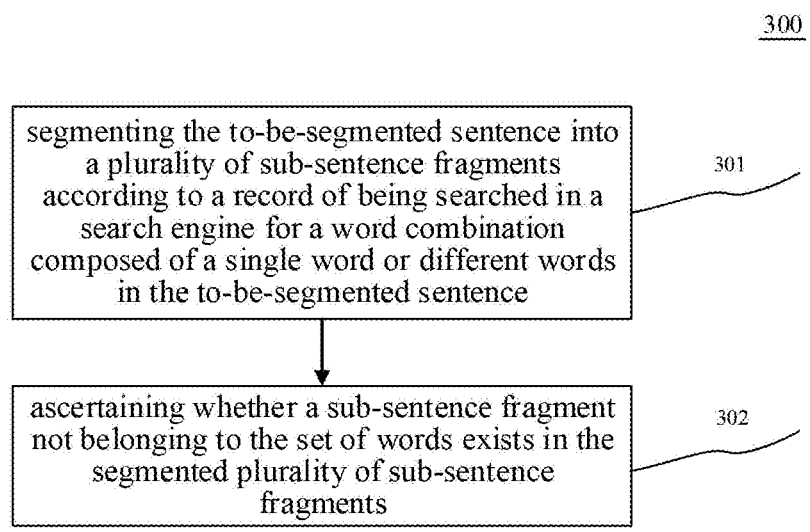
FIG. 3 is a flowchart of sentence segmentation steps involved in the corresponding embodiment of FIG. 2.

As shown in FIG. 3, the sentence segmenting steps may include: step 301, segmenting the to-be-segmented sentence into the plurality of sub-sentence fragments according to a record of being searched in a search engine for a word combination composed of a single word or different words in the to-be-segmented sentence; step 302, ascertaining whether a sub-sentence fragment not belonging to the set of words exists in the segmented plurality of sub-sentence fragments.

In step 301, the electronic device may preferentially determine the word combination composed of a single word or different words occurred in the search history of the search engine as the segmented sub-sentence fragment, and may further perform lexing based on the search frequency or other features. Each sub-sentence fragment after segmentation is a single word or a combination of words.

In step 302, for the segmented sub-sentence fragments segmented in step 301, the electronic device may ascertain respectively whether each of the sub-sentence fragments belongs to the set of words. The result of the ascertainment may be used for subsequent operations.

Step 203, using the sub-sentence fragment not belonging to the set of words as the to-be-segmented sentence and continuing to perform the sentence segmentation steps, if the sub-sentence fragment not belonging to the set of words exists.

In the present embodiment, if the result of the ascertainment in step 302 is that the sub-sentence fragment not belonging to the set of words exists, the electronic device may determine the sub-sentence fragment not belonging to the set of words as the to-be-segmented sentence and continue to perform the sentence segmentation steps. It needs to be noted that this step may be repeated multiple times until the sentence segmentation steps have been executed on all sub-sentence fragments not belonging to the set of words.

Step 204, storing the original sentence in association with the plurality of sub-sentence fragments each time obtained by performing the sentence segmentation steps.

In the present embodiment, the electronic device may store the original sentence in association with the plurality of sub-sentence fragments each time obtained by performing the sentence segmentation steps. In practice, it may be stored through various storage structures.

In some alternative implementations of the present embodiment, step 301 may specifically include the following process: extracting at least one feature vector according to the record of being searched in the search engine for the word combination composed of the single word or the different words in the to-be-segmented sentence; inputting the at least one feature vector into a recurrent neural network model to determine a segmentation point for segmenting the to-be-segmented sentence according to a sequence output by the recurrent neural network model, wherein the recurrent neural network model is used to characterize a correspondence between the at least one feature vector extracted according to the record of being searched in the search engine for the word combination composed of the single word or the different words in the to-be-segmented sentence and a description for whether the words in the to-be-segmented sentence are in a sequence at the segmenting; and segmenting the to-be-segmented sentence into the plurality of sub-sentence fragments according to the determined segmentation point.

In this implementation, the recurrent neural network model is used to characterize a correspondence between the at least one feature vector extracted according to the record of being searched in the search engine for the word combination composed of the single word or the different words in the segmented sentence in a search engine and a sequence corresponding to whether the words in the segmented sub-sentence fragments are segmentation points. In this way, when the at least one feature vector is input to the recurrent neural network model, it may be determined according to the sequence output by the recurrent neural network model that whether each of the words in the to-be-segmented sentence is a segmentation point, so as to further determine each sub-sentence fragment obtained by segmenting. The input layer of the recurrent neural network model is the feature vector extracted based on the to-be-segmented sentence, the intermediate layer is the recurrent neural network, and the top layer is the softmax transformation. The sequence output by the recurrent neural network model may be a digit sequence consisting of 1 and 2, wherein each number in the digit sequence corresponds to each word in the to-be-segmented sentence, to characterize whether the word is a segmentation point of the segmented sentence fragment. For example, 1 may characterize that the word is not a segmentation point, 2 may characterize that the word is a segmentation point. For example, for the to-be-segmented sentence, "I want to take a taxi to Heilongjiang Hailar," the most basic words contained are "I," "want to," "take a taxi," "to," "Heilongjiang" and "Hailar." If the output sequence is (1, 1, 2, 2, 1, 2), the numbers corresponding to 1, 1, 2, 2, 1, 2 in the sequence respectively characterize whether "I," "want to," "take a taxi," "to," "Heilongjiang," "Hailar" are segmentation points. That is, "take a taxi," "to," and "Hailar" are respectively the segmentation points, the other words are not segmentation points, and the corresponding segmentation result is "I want to take a taxi," "to," "Heilongjiang Hailar." It needs to be noted that, since whether the last word in the sentence is a segmentation point does not affect the segmentation result, the last word may not be characterized by a number. It also needs to be noted that using 1 or 2 to indicate that the words are non-segmentation points or segmentation points are merely examples. In practice, it is also possible to use 2 for non-segmentation points and 1 for segmentation points, and to use other different numbers to characterize respectively whether the words are segmentation points.

In this implementation, the recurrent neural network model may be used to perform the sentence segmentation steps each time. It has strong generalization ability with respect to the sentence segmentation, and has a wide application range.

In some alternative implementations of the present embodiment, the extracting at least one feature vector according to a record of being searched in a search engine for a word combination composed of a single word or different words in the to-be-segmented sentence may include at least one of: extracting a feature vector according to whether the word combination composed of the different words in the to-be-segmented sentence has a matching search sentence in a search sentence dictionary and/or a score of the search sentence matching the search sentence dictionary; and extracting a feature vector corresponding to a word according to a number or a sum of scores of search sentences beginning, intermediating or ending with each word in the to-be-segmented sentence in the search sentence dictionary; wherein the search sentence dictionary records search sentences searched using the search engine, the score of each search sentence is generated according to a search frequency of the search sentence and/or use feedback information of the user conducting a search. The search sentence dictionary may serve as a basic dictionary for other operations, and may reflect whether the word or the combination of words has been searched by the user and a specific search frequency.

Figures 4, 5:
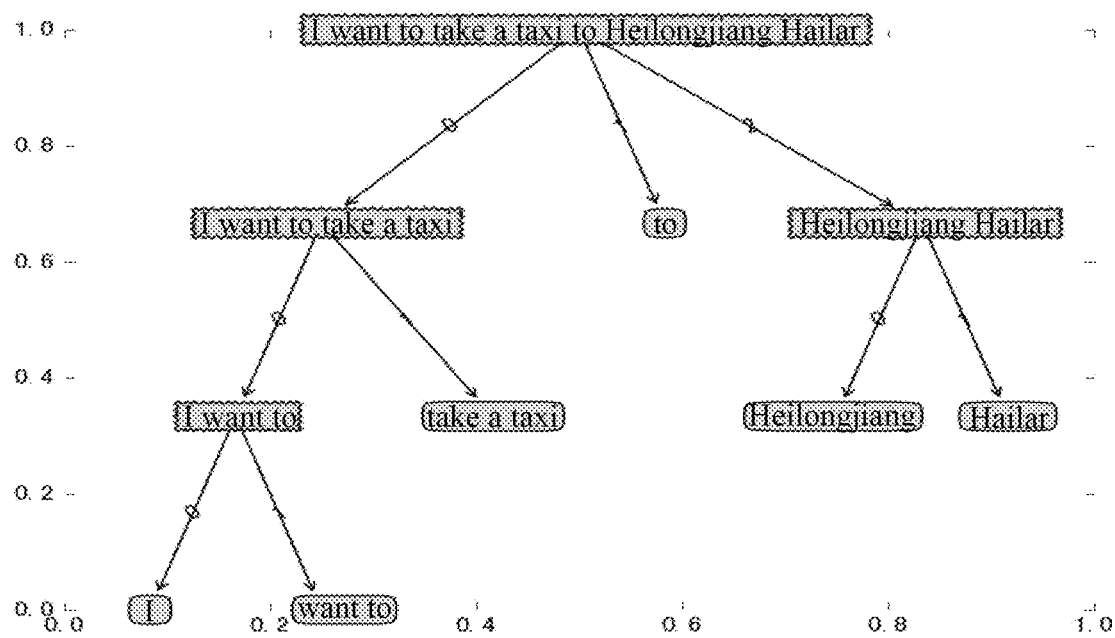
FIG. 4 is a schematic diagram of constructing a search sentence dictionary.
FIG. 5 is a schematic diagram of segmenting a sentence with a least segmentation algorithm.

FIG. 4 shows search sentences and scores of the search sentences matched with the words or combination of words involved in the sentence "I want to take a taxi to Heilongjiang Hailar" in the search sentences. Here, the word "I" matches a search sentence with a score of 6.42, the words "want to" match a search sentence with a score of 5.09, the combination of words "I" and "want to" matches a search sentence with a score of 6.36, the words "take a taxi" match a search sentence with a score of 5.31, the combination of words "I" and "take a taxi" matches a search sentence with a score of 5.39, the combination of words "I," "want to" and "take a taxi" matches a search sentence with a score of 4.65, the word "to" matches a search sentence with a score of 3.02, the combination of words "I" and "to" matches a search sentence with a score of 6.36, the combination of words "I," "want to" and "to" matches a search sentence with a score of 3.51, the word "Heilongjiang" matches a search sentence with a score of 7.69, the word "Hailar" matches a search sentence with a score of 8.06, and the combination of words "I" and "take a taxi" matches a search sentence with a score of 3.33.

The based on whether the word combination composed of the different words in the to-be-segmented sentence has a matching search sentence in a search sentence dictionary, refers to the respective extractions of different feature vectors in two cases when there is and is not a matching search sentence in the search sentence dictionary for the word combination. When extracting the feature vector based on the score of the search sentence in the search sentence dictionary matched with the word combination composed of different words in the to-be-segmented sentence, the corresponding feature vector may be extracted based on the score of the search sentence. For the example in FIG. 4, the combination of words "I" and "want to" matches a search sentence with a score of 6.36, then the feature vector corresponding to the combination of words formed by the first two words may be extracted according to the 6.36.

As to the extracting a feature vector corresponding to a word according to a number or a sum of scores of search sentences beginning, intermediating or ending with each word in the to-be-segmented sentence in the search sentence dictionary, search sentences beginning with the word "I" are shown as examples. The search sentences beginning with the word "I" respectively include the search sentence consisting of "I" and "want to," the search sentence consisting of "I" and "take a taxi," the search sentence consisting of "I," "want to" and "take a taxi," the search sentence consisting of "I" and "to," and the search sentence consisting of "I," "want to" and "to." It can be seen that the number of the search sentences beginning with the word "I" is 5. In addition, the scores of these 5 search sentences are 6.36, 5.39, 4.65, 6.36 and 3.51 respectively, so the sum of the scores is 26.27. In this case, the extracting a feature vector corresponding to a word according to a number or a sum of scores of search sentences beginning, intermediating or ending with "I" in the to-be-segmented sentence in the search sentence dictionary may extract a corresponding feature vector based on numerical values such as 5 and/or 26.27. Similarly, when extracting a feature vector corresponding to a word based on a number or a sum of scores of search sentences intermediating with "want to," the corresponding search sentences include the search sentence consisting of "I," "want to" and "take a taxi," and the search sentence consisting of "I," "want to" and "to," the number is 2 and the corresponding sum of the scores is 4.65+3.51=8.16, therefore the feature vector may be extracted based on 2 and/or 8.16. Extracting a feature vector corresponding to a word according to a number or a sum of scores of search sentences ending with a word is similar to the beginning, intermediating method, detailed description thereof will be omitted.

In this implementation, the corresponding feature vector may be extracted by inquiring the scores of various combinations of words in the search sentence dictionary, and the method of extracting the feature vector is relatively simple.

In some alternative implementations of the present embodiment, the extracting at least one feature vector according to a record of being searched in a search engine for the word combination composed of the single word or the different words in the to-be-segmented sentence further includes at least one of: extracting a word vector of the each word in the to-be-segmented sentence; and extracting a context feature vector of a context sentence of the to-be-segmented sentence in the original sentence. In this implementation, when extracting the at least one feature vector, the feature vector may also be extracted by other two manners: the first manner is to extract the word vector of each word in the to-be-segmented sentence as the feature vector; the second manner is to extract the feature vector according to the context sentence of the to-be-segmented sentence in the original sentence.

In this implementation, in addition to extracting the feature vector according to the search sentence dictionary, the word vector of each word and the context feature vector are also extracted, so that the versatility and the accuracy of performing the sentence segmentation steps through the recurrent neural network model are further increased, and the integrity of the overall solution is further improved.

In some alternative implementations of the present embodiment, the method further includes constructing the search sentence dictionary. Here, the constructing the search sentence dictionary may be performed as follows: firstly, acquiring a set of search sentences input by the user when using the search engine; secondly, filtering the set of search sentences according to the search frequency of the search sentences; then, generating the score of each search sentence in the search sentences according to the search frequency of the search sentences and the use feedback information of the user conducting the search using the search sentences; and finally, storing the search sentences in association with corresponding scores to construct the search sentence dictionary. For the search sentence dictionary constructed in this method, search sentences and scores corresponding to the search sentences may be searched from the search sentence dictionary in a subsequent process.

Alternatively, the search sentence dictionary may be generated according to the following specific procedures: firstly, a user search log may be obtained. The user search log may include a set of search sentences entered by the user using the search engine, a search frequency of each search sentence in the set of search sentences and use feedback information of the user conducting the search using the search sentences. The search frequency refers to the number of times that the search sentence is searched. The use feedback information is the satisfaction rating information of the user to the search result after using the search sentence. This satisfaction rating information may be positive or negative, and may be quantified by numerical values. Generally, the use feedback information may be determined according to whether the user further clicks the search result, thus the feedback information may also be referred to as a click extension feature. Secondly, search sentences with lower frequency in the set of search sentences may be filtered out by the search frequency, and search sentences with high search frequency may be kept for subsequent processing. Then, the search sentences may be scored separately based on the search frequency and the use feedback information to obtain search frequency scores and satisfaction scores of the search sentences, and final scores of the search sentences may be obtained by a calculation of the search frequency scores and the satisfaction scores using a certain calculation method. The satisfaction scores may be obtained by the search engine scoring according to a unified strategy, and may be scores obtained by adopting the search frequency scores directly or obtained by performing a corresponding process on the search frequency.

Alternatively, the formula for calculating the final score is:

$$score = score_{satisfy} * \log_2(score_{satisfy}/count_{search})$$

In the above formula, score is the final score of a search sentence, $score_{satisfy}$ is the satisfaction score, and $count_{search}$ is the search frequency score.

The solution of this implementation method does not require the artificial excavating of specific fragments when constructing the dictionary, may directly use the noisy data to construct the dictionary, and has a strong versatility.

In some alternative implementations of the present embodiment, the step 204 may specifically include: determining the original sentence as a root node, and determining successively the to-be-segmented sentence with the sentence segmentation steps performed each time and the plurality of sub-sentence fragments obtained by segmenting as a parent node and a plurality of corresponding child nodes, and constructing a tree hierarchy with nodes being sentence fragments. When constructing, the original sentence may be used as the root node in the tree hierarchy. After that, the to-be-segmented sentence with the sentence segmentation steps performed each time and the plurality of sub-sentence fragments obtained by the segmenting may be used as a parent node and a plurality of corresponding child nodes, to gradually construct the subsequent nodes of the tree hierarchy. In this implementation, storing the segmentation result of each of the segmentations associatively in a tree data structure facilitates the improving of the search efficiency in subsequent processes.

In some alternative implementations of the present embodiment, the method further includes training a model. The training a model may be performed according to the following method: acquiring a segmentation result generated by iteratively segmenting in advance a sample sentence according to a least segmentation algorithm; generating a training sample according to the segmentation result of each segmentation, and training the recurrent neural network model using the generated training sample; wherein an input vector in the training sample is at least one feature vector extracted according to a record of being searched in the search engine for the word combination composed of the single word or the different words in the segmented sentence of each segmentation, and the input vector in the training sample is a sequence used to describe whether the words in the segmented sentence of each segmentation are segmentation points. When a single training sample is used for training, the number of feature vectors cannot be determined in advance since each time the number of words in the segmented sentence is indefinite. The model is trained by being input each time into a feature vector of a fixed length and looping the input.

In the each segmentation of the segmentation result generated by iteratively segmenting the sample sentence in advance according to the least segmenting algorithm, it may be determined according to the segmenting relation that whether the words in the sentence fragment in the parent node are segmentation points. For example, when the segmented sentence fragment is "I want to take a taxi to Heilongjiang Hailar" and the plurality of sentence fragments after the segmentation are "I want to take a taxi," "to" and "Heilongjiang Hailar," then it may be analyzed that among the words "I," "want to," "take a taxi," "to," "Heilongjiang" and "Hailar" of the sentence fragment "I want to take a taxi to Heilongjiang Hailar," "take a taxi," "to" and "Hailar" may be considered as the segmentation points, and other words may be considered as the non-segmentation points. In this case, if the number 1 is used to characterize a non-segmentation point and the number 2 is used to characterize a segmentation point, the corresponding sequence is (1,1,2,2, 1,2), and the sequence may be used as an output vector for training. Then, at least one feature vector extracted according to the segmented sentence is used as an input vector to obtain a training sample of the known input vector and the output vector. The extraction process of the at least one feature vector may refer to the process of extracting at least one feature vector in the above sentence segmentation steps, and detailed description thereof is omitted. Finally, the obtained training samples may be used to train the recurrent neural network model.

Here, the least segmentation algorithm is a method that minimizes the number of sub-sentences segmented from the to-be-segmented sentence each time. Alternatively, when a plurality of segmentation methods exist, all minimizing the number of the segmented sub-sentences, adopting which segmentation method may be determined by a product of the scores of the sub-sentences after the segmentation. For example, the one with the greatest product of the scores may be used as the selected segmentation method. By sequentially using the least segmentation algorithm in a recursive manner, a multi-layered segmentation result may be obtained until the segmented sub-sentences are the most basic words. In practice, the training sample is generated according to the segmentation result obtained by segmenting a large number of sample sentences, in order to generate a recurrent neural network model with a better processing effect.

FIG. 5 is a schematic diagram describing the segmenting process of the original sentence "I want to take a taxi to Heilongjiang Hailer." Firstly, segmenting the original sentence "I want to take a taxi to Heilongjiang Hailar" using the least segmentation method, to obtain the segmentation result with the least sub-sentences: "I want to take a taxi," "to," and "Heilongjiang Hailar." Here, "to" is already a basic word, and does not require further segmentation, but "I want to take a taxi" and "Heilongjiang Hailar" are not basic words, it is still necessary to further segment by taking "I want to take a taxi" and "Heilongjiang Hailar" respectively as the to-be-segmented sentences. In the further segmentation of "I want to take a taxi," two sub-sentence fragments "I want to" and "take a taxi," are segmented by adopting the least segmentation algorithm, and "I want to" is further segmented into "I" and "want to." As to "Heilongjiang Hailar," "Heilongjiang" and "Hailar" are segmented by adopting the least segmentation algorithm. Finally, a sample tree hierarchy for characterizing the multi-layered segmentation result as shown in FIG. 5 may be obtained. By using the least segmentation algorithm, the training sample for training the recurrent neural network may be obtained. The data are widely available and an artificial fining processing is not required.

The method provided by the above embodiments of the present disclosure may perform recurrently a multi-level and multi-granularity segmentation to the original sentence so that the segmentation result may be applied more widely and has a high versatility.

Figure 6:
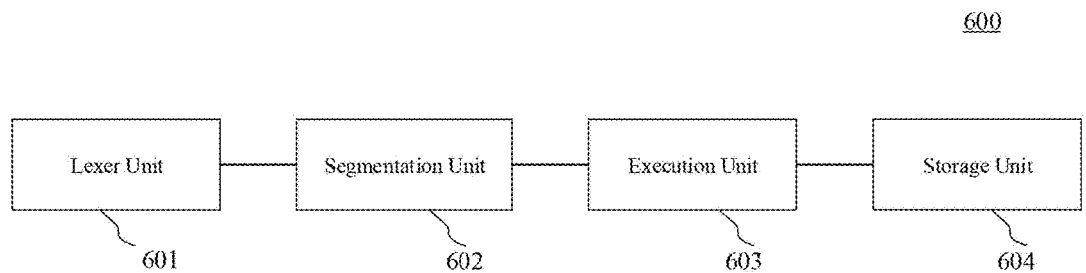
FIG. 6 is a schematic structural diagram of an embodiment of an artificial intelligence based apparatus for segmenting a sentence according to the present disclosure.

With further reference to FIG. 6, as an implementation to the method illustrated in the above figures, the present disclosure provides an embodiment of an artificial intelligence based apparatus for segmenting a sentence. The apparatus embodiment corresponds to the method embodiment shown in FIG. 2, and the apparatus may be specifically applied to various electronic devices.

As shown in FIG. 6, the artificial intelligence based apparatus 600 for segmenting a sentence according to the present embodiment includes: a lexer unit 601, a segmentation unit 602, an execution unit 603 and a storage unit 604. Here, the lexer unit 601 is configured for lexing a to-be-segmented original sentence to obtain a set of words in the original sentence. The segmentation unit 602 is configured for driving the following subunits to perform sentence segmentation steps on the to-be-segmented sentence having an initial value being the original sentence: a segmentation subunit, configured for segmenting the to-be-segmented sentence into a plurality of sub-sentence fragments according to a record of being searched in a search engine for a word combination composed of a single word or different words in the to-be-segmented sentence, each sub-sentence fragment being a single word or a word combination; and an ascertainment subunit, configured for ascertaining whether a sub-sentence fragment not belonging to the set of words exists in the segmented plurality of sub-sentence fragments. The execution unit 603 is configured for feeding back the sub-sentence fragment not belonging to the set of words as the to-be-segmented sentence to the segmentation unit 602, if a sub-sentence fragment not belonging to the set of words exists in the plurality of sub-sentence fragments. The storage unit 604 is configured for storing the original sentence in association with the plurality of sub-sentence fragments each time obtained by performing the sentence segmentation steps.

In some alternative implementations of the present embodiment, the segmentation subunit includes: an extraction module, configured for extracting at least one type of feature vector according to the record of being searched in the search engine for the word combination composed of the single word or the different words in the to-be-segmented sentence; a determination unit, configured for inputting the at least one type of feature vector into a recurrent neural network model to determine a segmentation point for segmenting the to-be-segmented sentence according to a sequence output by the recurrent neural network model, wherein the recurrent neural network model is used to characterize a correspondence between the at least one type of feature vector extracted according to the record of being searched in the search engine for the word combination composed of the single word or the different words in the to-be-segmented sentence in the search engine and a description for whether the words in the to-be-segmented sentence are in a sequence at the segmenting; and a segmentation module, configured for segmenting the to-be-segmented sentence into the plurality of sub-sentence fragments according to the determined segmentation point.

In some alternative implementations of the present embodiment, the extraction module is configured for performing at least one of: extracting a feature vector based on whether the word combination composed of the different words in the to-be-segmented sentence has a matching search sentence in a search sentence dictionary and/or a score of the search sentence matching the search sentence dictionary; extracting a feature vector corresponding to a word based on a number or a sum of scores of search sentences beginning, intermediating or ending with each word in the to-be-segmented sentence in the search sentence dictionary; wherein the search sentence dictionary records search sentences searched using the search engine, the score of each search sentence is generated according to a search frequency of the search sentence and/or use feedback information of the user conducting a search.

In some alternative implementations of the present embodiment, the extraction module is further configured for performing at least one of: extracting a word vector of each word in the to-be-segmented sentence; and extracting a context feature vector of a context sentence of the to-be-segmented sentence in the original sentence.

In some alternative implementations of the present embodiment, the apparatus 600 further includes a search sentence dictionary construction unit (not shown), configured for: acquiring a set of search sentences input by the user when using the search engine; filtering the set of search sentences according to the search frequency of the search sentences; generating the score of the each search sentence in the search sentences according to the search frequency of the search sentences and the use feedback information of the user conducting the search using the search sentences; and storing the search sentences in association with corresponding scores to construct the search sentence dictionary.

In some alternative implementations of the present embodiment, the apparatus 600 further includes a model training unit, and the model training unit is configured for: acquiring a segmentation result generated by iteratively segmenting in advance a sample sentence according to a least segmentation algorithm; and generating a training sample according to the segmentation result of each segmentation, and training the recurrent neural network model using the generated training sample; wherein an input vector in the training sample is at least one type of feature vector extracted according to the record of being searched in the search engine for the word combination composed of the single word or the different words in the segmented sentence of each segmentation, and the input vector in the training sample is a sequence used to describe whether the words in the segmented sentence of each segmentation are segmentation points.

In some alternative implementations of the present embodiment, the storage unit 204 is further configured for: determining the original sentence as a root node, and determining successively the to-be-segmented sentence with the sentence segmentation steps performed each time and the plurality of sub-sentence fragments obtained by segmenting as a parent node and a plurality of corresponding child nodes, and constructing a tree hierarchy with nodes being sentence fragments.

In addition, the present disclosure provides an embodiment of an artificial intelligence based apparatus for segmenting a sentence. The apparatus embodiment corresponds to the method embodiment shown in FIG. 2, and the apparatus may be specifically applied to various electronic devices. The electronic device may be a terminal device or a server.

Figure 7:
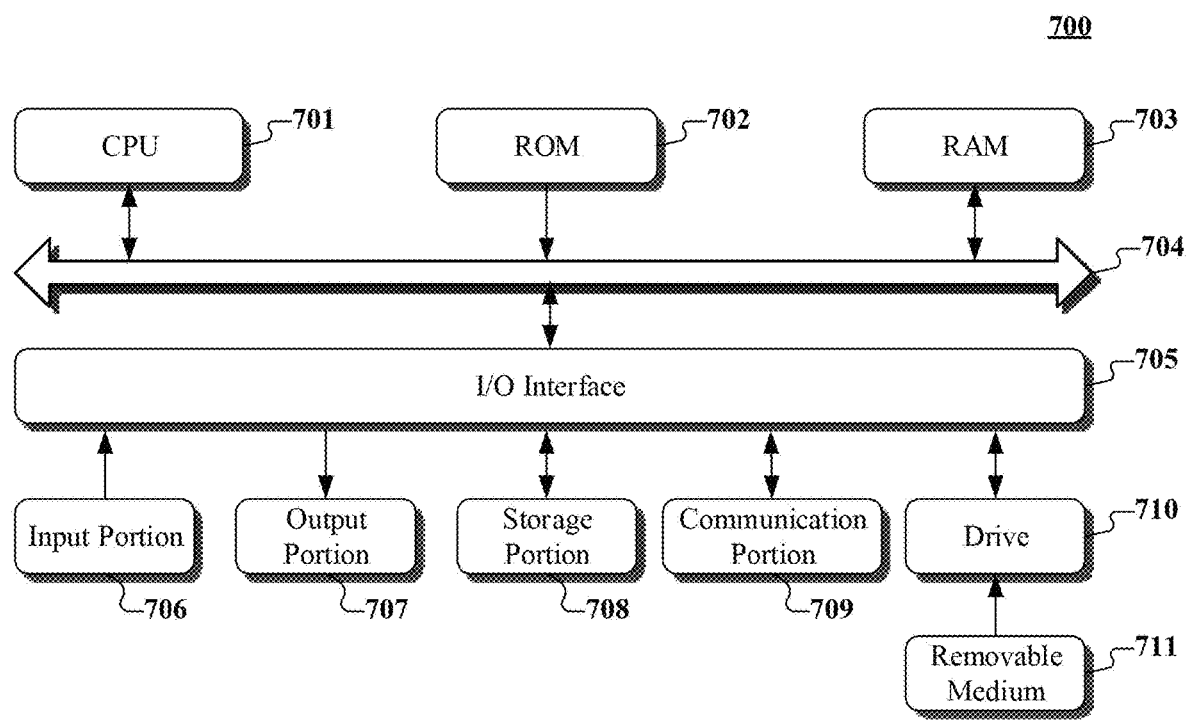
FIG. 7 is a schematic structural diagram of a computer system adapted to implement a terminal device or a server of embodiments of the present disclosure.

With reference to FIG. 7, which shows a schematic structural diagram of a computer system 700 adapted to implement a terminal device or a server of the embodiments of the present disclosure. The terminal device/server shown in FIG. 7 is merely an example and should not impose any restriction on the functions and the scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A drive 710 is also connected to the I/O interface 705 as required. A removable medium 711, such as a magnetic disk, an optical disk, a magneto-optical disk, and a semiconductor memory, may be installed on the drive 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711. The computer program, when executed by the central processing unit (CPU) 701, implements the above mentioned functionalities as defined by the methods of the present disclosure.

It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a lexer unit, a segmentation unit, an execution unit and a storage unit, where the names of these units or modules do not in some cases constitute a limitation to such units or modules themselves. For example, the lexer unit may also be described as "a unit for lexing a to-be-segmented original sentence to obtain a set of words in the original sentence."

In another aspect, the present application further provides a non-volatile computer-readable storage medium. The non-volatile computer-readable storage medium may be the non-volatile computer-readable storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to: lex a to-be-segmented original sentence to obtain a set of words in the original sentence; perform sentence segmentation steps on a to-be-segmented sentence having an initial value being the original sentence, the sentence segmentation steps including: segmenting the to-be-segmented sentence into a plurality of sub-sentence fragments according to a record of being searched in a search engine for a word combination composed of a single word or different words in the to-be-segmented sentence, each sub-sentence fragment being a single word or a word combination; and ascertaining whether a sub-sentence fragment not belonging to the set of words exists in the segmented plurality of sub-sentence fragments; use the sub-sentence fragment not belonging to the set of words as the to-be-segmented sentence and continuing to perform the sentence segmentation steps, if the sub-sentence fragment not belonging to the set of words exists; and store the original sentence in association with the plurality of sub-sentence fragments each time obtained by performing the sentence segmentation steps.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. An artificial intelligence based method for segmenting a sentence, the method comprising:
    lexing a to-be-segmented original sentence to obtain a word set comprising a plurality of basic words in the original sentence;
    performing sentence segmentation steps on a to-be-segmented sentence being the original sentence, the sentence segmentation steps comprising: segmenting the to-be-segmented sentence into a plurality of sub-sentence fragments according to a search record using a search engine for a single word or a word combination composed of different words in the to-be-segmented sentence, the search record being a search sentence dictionary reflecting whether the single word or the word combination has been searched by a user and a search frequency for the single word or the word combination, each sub-sentence fragment being a single word or a word combination; and ascertaining whether a sub-sentence fragment not corresponding to any one of the basic words in the word set exists in the segmented plurality of sub-sentence fragments;
    using the sub-sentence fragment not corresponding to any one of the basic words in the word set as a new to-be-segmented sentence and continuing to perform the sentence segmentation steps on the new to-be-segmented sentence according to the search record, in response to that the sub-sentence fragment not corresponding to any one of the basic words in the word set exists; and
    associatively storing the original sentence and the plurality of sub-sentence fragments each time obtained by performing the sentence segmentation steps;
    wherein the segmenting the to-be-segmented sentence into a plurality of sub-sentence fragments according to a search record in a search engine for a single word or a word combination composed of different words in the to-be-segmented sentence comprises:
    extracting at least one type of feature vector according to the search record using the search engine for the single word or the word combination composed of different words in the to-be-segmented sentence;
    inputting the at least one type of feature vector into a recurrent neural network model to determine a segmentation point for segmenting the to-be-segmented sentence based on a sequence output by the recurrent neural network model, wherein the recurrent neural network model is used to characterize a corresponding relationship between the at least one type of feature vector extracted according to the search record using the search engine for the single word or the word combination composed of different words in the to-be-segmented sentence and a description for whether words in the to-be-segmented sentence are in a sequence at the segmenting; and
    segmenting the to-be-segmented sentence into the plurality of sub-sentence fragments according to the determined segmentation point;
    wherein the method further comprises training a model, comprising:
    acquiring a segmentation result generated by iteratively segmenting in advance a sample sentence according to a least segmentation algorithm; and
    generating a training sample based on the segmentation result of each segmentation, and training the recurrent neural network model using the generated training sample;
    wherein an input vector in the training sample is at least one type of feature vector extracted according to the search record using the search engine for the single word or the word combination composed of different words in the segmented sentence of each segmentation, and the input vector in the training sample is a sequence used to describe whether the words in the segmented sentence of each segmentation are segmentation points.

2. The method according to claim 1, wherein the extracting at least one type of feature vector according to the search record using the search engine for the single word or the word combination composed of different words in the to-be-segmented sentence comprises at least one of:
    extracting a feature vector based on whether the word combination composed of the different words in the to-be-segmented sentence has a matching search sentence in the search sentence dictionary and/or a score of the search sentence matching the search sentence dictionary; or
    extracting a feature vector corresponding to a word based on a number or a sum of scores of search sentences beginning, intermediating or ending with each word in the to-be-segmented sentence in the search sentence dictionary;
    wherein the search sentence dictionary records search sentences searched using the search engine, the score of each search sentence is generated based on a search frequency of the search sentence and/or use feedback information of a user conducting a search.

3. The method according to claim 2, wherein the extracting at least one type of feature vector according to the search record using the search engine for the single word or the word combination composed of different words in the to-be-segmented sentence further comprises at least one of:
    extracting a word vector of each word in the to-be-segmented sentence; or
    extracting a context feature vector of a context sentence of the to-be-segmented sentence in the original sentence.

4. The method according to claim 2, wherein the method further comprises constructing the search sentence dictionary, comprising:
- acquiring a set of search sentences input by the user when using the search engine;
- filtering the set of search sentences according to the search frequency of the search sentences;
- generating the score of the each search sentence in the search sentences according to the search frequency of the search sentences and the use feedback information of the user conducting the search using the search sentences; and
- storing the search sentences in association with corresponding scores to construct the search sentence dictionary.

5. The method according to claim 1, wherein the associatively storing the original sentence and the plurality of sub-sentence fragments each time obtained by performing the sentence segmentation steps comprises:
- determining the original sentence as a root node, and determining successively the to-be-segmented sentence with the sentence segmentation steps performed each time and the plurality of sub-sentence fragments obtained by segmenting as a parent node and a plurality of corresponding child nodes, and constructing a tree hierarchy with nodes being sentence fragments.

6. An artificial intelligence apparatus for segmenting a sentence, the apparatus comprising:
- at least one processor; and
- a memory storing instructions, the instructions when executed by the at least one processor, cause the at least one processor to perform operations, the operations comprising:
  - lexing a to-be-segmented original sentence to obtain a word set comprising a plurality of basic words in the original sentence;
  - performing sentence segmentation steps on the to-be-segmented sentence being the original sentence, the sentence segmentation steps comprising: segmenting the to-be-segmented sentence into a plurality of sub-sentence fragments according to a search record using a search engine for a single word or a word combination composed of different words in the to-be-segmented sentence, the search record being a search sentence dictionary reflecting whether the single word or the word combination has been searched by a user and a search frequency for the single word or the word combination, each sub-sentence fragment being a single word or a word combination; and ascertaining whether a sub-sentence fragment not corresponding to any one of the basic words in the word set exists in the segmented plurality of sub-sentence fragments;
  - using the sub-sentence fragment not corresponding to any one of the basic words in the word set as a new to-be-segmented sentence and continuing to perform the sentence segmentation steps on the new to-be-segmented sentence according to the search record, in response to that the sub-sentence fragment not corresponding to any one of the basic words in the word set exists; and
  - associatively storing the original sentence and the plurality of sub-sentence fragments each time obtained by performing the sentence segmentation steps;
  - wherein the segmenting the to-be-segmented sentence into a plurality of sub-sentence fragments according to a search record using a search engine for a single word or a word combination composed of different words in the to-be-segmented sentence comprises:
    - extracting at least one type of feature vector according to the search record in the search engine for the single word or the word combination composed of different words in the to-be-segmented sentence;
    - inputting the at least one type of feature vector into a recurrent neural network model to determine a segmentation point for segmenting the to-be-segmented sentence based on a sequence output by the recurrent neural network model, wherein the recurrent neural network model is used to characterize a correspondence between the at least one type of feature vector extracted according to the search record in the search engine for the single word or the word combination composed of different words in the to-be-segmented sentence and a description for whether words in the to-be-segmented sentence are in a sequence at the segmenting; and
    - segmenting the to-be-segmented sentence into the plurality of sub-sentence fragments according to the determined segmentation point;
  - wherein the operations further comprise training a model, comprising:
    - acquiring a segmentation result generated by iteratively segmenting in advance a sample sentence according to a least segmentation algorithm; and
    - generating a training sample based on the segmentation result of each segmentation, and training the recurrent neural network model using the generated training sample;
  - wherein an input vector in the training sample is at least one type of feature vector extracted according to the search record using the search engine for the single word or the word combination composed of different words in the segmented sentence of each segmentation, and the input vector in the training sample is a sequence used to describe whether the words in the segmented sentence of each segmentation are segmentation points.

7. The apparatus according to claim 6, wherein the extracting at least one type of feature vector according to the search record using the search engine for the single word or the word combination composed of different words in the to-be-segmented sentence comprises at least one of:
- extracting a feature vector based on whether the word combination composed of the different words in the to-be-segmented sentence has a matching search sentence in the search sentence dictionary and/or a score of the search sentence matching the search sentence dictionary; or
- extracting a feature vector corresponding to a word based on a number or a sum of scores of search sentences beginning, intermediating or ending with each word in the to-be-segmented sentence in the search sentence dictionary;
- wherein the search sentence dictionary records search sentences searched using the search engine, the score of each search sentence is generated based on a search frequency of the search sentence and/or use feedback information of a user conducting a search.

8. The apparatus according to claim 7, wherein the extracting at least one type of feature vector according to the search record using the search engine for the single word or the word combination composed of different words in the to-be-segmented sentence further comprises at least one of:
- extracting a word vector of each word in the to-be-segmented sentence; or extracting a context feature vector of a context sentence of the to-be-segmented sentence in the original sentence.

9. The apparatus according to claim 7, wherein the operations further comprise constructing the search sentence dictionary, comprising:
acquiring a set of search sentences input by the user when using the search engine;
filtering the set of search sentences according to the search frequency of the search sentences;
generating the score of the each search sentence in the search sentences according to the search frequency of the search sentences and the use feedback information of the user conducting the search using the search sentences; and
storing the search sentences in association with corresponding scores to construct the search sentence dictionary.

10. The apparatus according to claim 6, wherein the associatively storing the original sentence and the plurality of sub-sentence fragments each time obtained by performing the sentence segmentation steps comprises:
determining the original sentence as a root node, and determining successively the to-be-segmented sentence with the sentence segmentation steps performed each time and the plurality of sub-sentence fragments obtained by segmenting as a parent node and a plurality of corresponding child nodes, and constructing a tree hierarchy with nodes being sentence fragments.

11. A non-transitory computer storage medium storing a computer program, the computer program when executed by one or more processors, causes the one or more processors to perform operations, the operations comprising:
lexing a to-be-segmented original sentence to obtain a word set comprising a plurality of basic words in the original sentence;
performing sentence segmentation steps on a to-be-segmented sentence being the original sentence, the sentence segmentation steps comprising: segmenting the to-be-segmented sentence into a plurality of sub-sentence fragments according to a search record using a search engine for a single word or a word combination composed of different words in the to-be-segmented sentence, the search record being a search sentence dictionary reflecting whether the single word or the word combination has been searched by a user and a search frequency for the single word or the word combination, each sub-sentence fragment being a single word or a word combination; and ascertaining whether a sub-sentence fragment not corresponding to any one of the basic words in the word set exists in the segmented plurality of sub-sentence fragments;
using the sub-sentence fragment not corresponding to any one of the basic words in the word set as a new to-be-segmented sentence and continuing to perform the sentence segmentation steps on the new to-be-segmented sentence according to the search record, in response to that the sub-sentence fragment not corresponding to any one of the basic words in the word set exists; and
associatively storing the original sentence and the plurality of sub-sentence fragments each time obtained by performing the sentence segmentation steps;
wherein the segmenting the to-be-segmented sentence into a plurality of sub-sentence fragments according to a search record using a search engine for a single word or a word combination composed of different words in the to-be-segmented sentence comprises:
extracting at least one type of feature vector according to the search record in the search engine for the single word or the word combination composed of different words in the to-be-segmented sentence;
inputting the at least one type of feature vector into a recurrent neural network model to determine a segmentation point for segmenting the to-be-segmented sentence based on a sequence output by the recurrent neural network model, wherein the recurrent neural network model is used to characterize a correspondence between the at least one type of feature vector extracted according to the search record in the search engine for the single word or the word combination composed of different words in the to-be-segmented sentence and a description for whether words in the to-be-segmented sentence are in a sequence at the segmenting; and
segmenting the to-be-segmented sentence into the plurality of sub-sentence fragments according to the determined segmentation point;
wherein the operations further comprise training a model, comprising:
acquiring a segmentation result generated by iteratively segmenting in advance a sample sentence according to a least segmentation algorithm; and
generating a training sample based on the segmentation result of each segmentation, and training the recurrent neural network model using the generated training sample;
wherein an input vector in the training sample is at least one type of feature vector extracted according to the search record using the search engine for the single word or the word combination composed of different words in the segmented sentence of each segmentation, and the input vector in the training sample is a sequence used to describe whether the words in the segmented sentence of each segmentation are segmentation points.

* * * * *